Patented Sept. 11, 1934

1,973,621

UNITED STATES PATENT OFFICE 1,973,621

PROCESS OF REFINING MINERAL OIL

Francis X. Govers, Vincennes, Ind., assignor to Indian Refining Company, Lawrenceville, Ill., a corporation of Maine No Drawing. Application June 10, 1931, Serial No. 543,391

8 Claims. (Cl. 196—38)

This invention relates to a process of refining oils, the process being especially designed for and adapted to the treatment of lubricating oil or stock, or so-called wax distillate, derived from paraffin base crude petroleum.

The invention contemplates a process of refining hydrocarbon oil, more particularly lubricating oil containing fractions, wherein the oil is treated with mineral acid in successive dosages, then following removal of separated sludge, the acid-treated oil is washed with an alkaline solution and treated with a compound of the alkaline earth metals selected from the group of oxides, hydroxides and carbonates, following which it is dried to remove moisture, and then contacted with comminuted solid absorbent material and the resulting mixture subjected to filtration to remove the solid material and absorbed matter.

More specifically the process consists in the following sequence of steps: first, successively acid treating the oil, advantageously with relatively small but progressively increasing dosages of strong mineral acid; second, agitating and mixing the oil, advantageously at a temperature of about 100° F. to 110° F. with a relatively small amount of a dilute aqueous solution of sodium carbonate; third, adding and intimately admixing a finely divided alkaline earth metal compound such as slaked lime or the carbonate or hydroxide of either calcium or magnesium; fourth, drying the mixture by evaporating its water content; fifth, adding and intimately admixing a finely divided absorbent clay, such as fuller's earth; and sixth, filtering the mixture.

For the purpose of illustration, I will describe a specific procedure which I have found to be advantageous for the treatment of a lubricating stock obtained from crude petroleum of the type found in southern Illinois which has been dewaxed by being dissolved in a mixture of acetone and benzol, cooled to crystallize the wax, filtered to separate the crystallized wax and freed of acetone and benzol by distillation, as described in detail in my U. S. Patent No. 1,802,942.

The oil heated to a temperature of 95° F. to 110° F. is agitated for 10–15 minutes with an addition of three pounds of 66° Bé. sulphuric acid per 42 gallon barrel of oil, allowed to settle for 30 minutes and the settled sludge drawn off. The oil is then agitated for 20–25 minutes with an addition of eight pounds of 66° Bé. sulphuric acid per barrel of oil, settled for 2½ hours, and the settled sludge drawn off. The oil is then agitated for about 25 minutes with an addition of nine pounds of 66° Bé. sulphuric acid per barrel of oil, after which a 50% aqueous solution of sulphuric acid in quantity, amounting to about 3% of the oil by volume is added, the mixture is agitated by means of air jets for about 15 minutes, settled for from three to twelve hours, and the settled sludge separated from the oil. This last step is known as "coking" and serves to coagulate the sludge formed by the acid treatment and is ordinarily accomplished by the addition of water instead of 50% sulphuric acid as described. The oil is advantageously maintained at a temperature of from 100° F. to 110° F. throughout the described acid treatment. It will be understood that the specific acid treatment of the oil described is capable of considerable variation; for instance, with respect to the total quantity of acid used, the relative amounts of the several additions, the number of additions, the times of agitation and settling, and that the acid treatment may be entirely omitted without departing from my invention as defined in some of the appended claims. The described procedure, that is, applying the acid in a plurality of steps while maintaining the oil at near 100° F. followed by "coking" with dilute acid gives most satisfactory results.

The acid-treated oil still maintained at a temperature of about 100° F. to 110° F. is transferred to a mixing tank and agitated for about ten minutes with an addition of a 5% solution of sodium carbonate, said solution amounting to about 2% of the oil by volume. Five and one-quarter (5¼) pounds of hydrated lime per barrel of oil are then added and the agitation continued for 15 minutes or until the lime is thoroughly mixed with the oil. The mixture is then gradually heated up to a final temperature of 220° F. and held at this temperature until quite dry, after which 10½ pounds of finely divided (advantageously of about 200 mesh) clay of the type of fuller's earth per barrel of oil are added and the mixture is heated up to 240° F., agitated for about 15 minutes and then filtered at this temperature.

The described procedure is capable of some variation; for instance, with respect to the amounts of sodium carbonate, lime and clay used, the times of agitation and the temperatures, but I regard it as being essential to mix the oil at a temperature in the neighborhood of 100° F., first with dilute sodium carbonate solution and then with the hydrated lime while maintaining said temperature, and then to dry the mixture before adding the clay. The clay may, of course, be replaced by other finely divided solid absorbents, and the filtering step may be replaced by settling or centrifuging, or instead of adding clay to the oil after its treatment with sodium carbonate and lime and drying, the oil may be passed through an absorbent filter bed.

It is noted, however, that the agitation of the oil with dilute sodium carbonate solution followed by agitation with lime brings about a purifying and decolorizing effect not attainable in any other way; for instance, by the use of sodium carbonate alone or caustic soda alone or lime alone. The theory may be advanced that the sodium carbonate solution emulsifies with the oil, thereby coming into very intimate contact with it, and that the emulsified sodium carbonate solution serves as a vehicle for the lime, thereby bringing about a very efficient contact between the oil and the lime. Possibly the neutralization products formed when using lime or an alkaline earth metal compound treating material are insoluble in the oil and, therefore, readily separated out. The process may be applied to wax distillate before dewaxing, but as stated above, the specific procedure described is preferred. The purpose of the treatment, of course, is to remove from the oil acidity, sulphur compounds and colored bodies, or bodies which tend to give rise to color upon exposure of the oil to heat, and I have found that the specific procedure described gives satisfactory results.

While the use of lime has been described in the above example, the oxides, hydroxides and carbonates of the alkaline earth metals generally are particularly effective in this connection, and it has been found that magnesium oxide or hydroxide may be quite satisfactorily substituted for lime in carrying out my invention.

Obviously many modifications and variations of the invention, as hereinbefore set forth, may be made without departing from the spirit and scope thereof, and therefore only such limitations should be imposed as are indicated in the appended claims.

I claim:

1. Process of refining lubricating oil which comprises treating the oil with concentrated sulphuric acid, removing separated sludge, agitating the acid-treated oil at a temperature of about 95° F. to 110° F. with a relatively small amount of a dilute aqueous solution of sodium carbonate thereby forming an emulsified mixture of aqueous alkali solution and oil, adding and thoroughly admixing a compound selected from the group consisting of calcium and magnesium oxides and hydroxides, drying the mixture by heating, adding and thoroughly admixing a finely divided absorbent clay and filtering the mixture to remove the solid material and absorbed matter.

2. Process of refining lubricating oils which comprises repeatedly agitating the oil at a temperature of about 100° F. to 110° F. with a relatively small addition of concentrated sulphuric acid and separating the resulting sludge, using progressively greater quantities of acid in each successive repetition of the operation, subjecting the oil after the last acid treatment and before the final separation of sludge to "coking" with a relatively small addition of 50% sulphuric acid, agitating the acid-treated oil at a temperature of 95° F. to 110° F. with a relatively small amount of a dilute aqueous solution of sodium carbonate thereby forming an emulsified mixture of aqueous alkali solution and oil, adding and thoroughly admixing calcium hydroxide, drying the mixture, mixing it with absorbent clay and filtering the mixture to remove the solid material and absorbed matter.

3. Process of refining dewaxed paraffin base lubricating stock which comprises subjecting the oil while maintaining it at a temperature of about 100° F. to 110° F. to a plurality of successive treatments with relatively small but progressively increasing amounts of concentrated sulphuric acid, agitating the acid-treated oil at said temperature with about 2% by volume of a 5% aqueous solution of sodium carbonate thereby forming an emulsified mixture of aqueous alkali solution and oil, adding and intimately admixing about five pounds of finely divided slaked lime per barrel of oil, thoroughly drying the mixture by gradually heating it up to a final temperature of about 220° F., adding and intimately admixing a finely divided absorbent clay, raising the temperature of the mixture to 240° F. and filtering the mixture while maintaining said temperature of about 240° F. to remove the solid material and absorbed matter.

4. Process of refining lubricating oils which comprises repeatedly agitating the oil at a temperature of about 100° F. to 110° F. with a relatively small addition of concentrated sulphuric acid and separating the resulting sludge, using progressively greater quantities of acid in each successive repetition of the operation, subjecting the oil after the last acid treatment and before the final separation of sludge to "coking" with a relatively small addition of 50% sulphuric acid, agitating the acid-treated oil at a temperature of 95° F. to 110° F. with a relatively small amount of a dilute aqueous solution of sodium carbonate thereby forming an emulsified mixture of aqueous alkali solution and oil, adding and thoroughly admixing magnesium hydroxide, drying the mixture, mixing it with absorbent clay, and filtering the mixture to remove the solid material and absorbed matter.

5. Process of refining mineral oil previously subjected to acid treatment which comprises agitating the oil at a temperature of about 95° F. to 110° F. with a relatively small amount of a dilute aqueous solution of sodium carbonate thereby forming an emulsified mixture of aqueous alkali solution and oil, adding and thoroughly admixing calcium hydroxide powder with the oil while maintaining said temperature, drying the mixture by gradually heating it to a final temperature of about 220° F., adding and thoroughly admixing a finely divided solid absorbent material and filtering the mixture to remove the solid material and absorbed matter.

6. Process of refining mineral oil previously subjected to acid treatment which comprises agitating the oil at a temperature of about 95° F. to 110° F. with a relatively small amount of a dilute aqueous solution of sodium carbonate thereby forming an emulsified mixture of aqueous alkali solution and oil, adding and thoroughly admixing magnesium hydroxide powder with the oil while maintaining said temperature, drying the mixture by gradually heating it to a final temperature of about 220° F., adding and thoroughly admixing a finely divided solid absorbent material and filtering the mixture to remove the solid material and absorbed matter.

7. In the process of refining mineral oil previously subjected to acid treatment the steps comprising agitating the oil at a temperature of about 95° F. to 110° F. with a relatively small amount of a dilute aqueous solution of sodium carbonate thereby forming an emulsified mixture of aqueous solution and oil, adding and thoroughly admixing therewith a compound selected from the group consisting of calcium and magnesium oxides and hydroxides in finely divided form, heating the mixture to remove its moisture content and subsequently removing the solid material and adhering absorbed matter therefrom.

8. In the process of refining mineral oil the steps comprising acid treating the oil, removing the resulting separated sludge, agitating the acid-treated oil at a temperature of about 95° F. to 110° F. with a relatively small amount of a dilute aqueous solution of sodium carbonate thereby forming an emulsified mixture of aqueous alkali solution and oil, adding and thoroughly admixing a compound selected from the group consisting of calcium and magnesium oxides and hydroxides therewith, heating the mixture to remove its moisture content and subsequently removing the solid material and adhering absorbed matter therefrom.

FRANCIS X. GOVERS.